(12) United States Patent
Fujimura

(10) Patent No.: US 7,334,240 B2
(45) Date of Patent: Feb. 19, 2008

(54) DISK APPARATUS

(75) Inventor: Nobuhiko Fujimura, Tokyo (JP)

(73) Assignee: TEAC Corporation, Tokyo (JP)

( * ) Notice: Subject to any disclaimer, the term of this patent is extended or adjusted under 35 U.S.C. 154(b) by 523 days.

(21) Appl. No.: 10/858,488

(22) Filed: Jun. 1, 2004

(65) Prior Publication Data

US 2005/0015783 A1 Jan. 20, 2005

(30) Foreign Application Priority Data

Jun. 2, 2003 (JP) ............... 2003-156965

(51) Int. Cl.
*G11B 17/04* (2006.01)
(52) U.S. Cl. .................................... 720/606
(58) Field of Classification Search ................ 720/619, 720/706, 604, 606
See application file for complete search history.

(56) References Cited

U.S. PATENT DOCUMENTS

| | | | | |
|---|---|---|---|---|
| 5,602,818 | A * | 2/1997 | Kage et al. ................. | 720/657 |
| 6,388,983 | B1 * | 5/2002 | Kikuchi ....................... | 720/710 |
| 6,560,171 | B2 * | 5/2003 | Satoh et al. ............. | 369/30.85 |
| 6,865,054 | B2 * | 3/2005 | Sawai ........................ | 360/96.5 |
| 7,117,511 | B2 * | 10/2006 | Kato .......................... | 720/692 |
| 2002/0031076 | A1 * | 3/2002 | Naruki et al. ............... | 369/270 |
| 2006/0230412 | A1 * | 10/2006 | Fujisawa et al. ............ | 720/626 |

FOREIGN PATENT DOCUMENTS

| | | |
|---|---|---|
| JP | 07-153165 | 6/1995 |
| JP | 2002-117604 | 4/2002 |
| JP | 2003-141849 A | 5/2003 |

* cited by examiner

*Primary Examiner*—Allen Cao
(74) *Attorney, Agent, or Firm*—Weingarten, Schurgin, Gagnebin & Lebovici LLP

(57) ABSTRACT

It is an object of the present invention to provide a high-reliability slot-in type disk apparatus having a buffering function against vibrations vertically generated in recording and reproducing data on an optical disk. A disk apparatus 1 according to the present invention comprises a lift mechanism for lifting up and down a clamp head 7 so as to be attached to and detached from an optical disk D, wherein a driven pin 43 is guided along a cam groove 34c formed in the lift mechanism and is elastically supported at an end portion P2 of the cam groove 34c.

11 Claims, 14 Drawing Sheets

DISK APPARATUS

This application claims priority to a Japanese application No. 2003-156965 filed Jun. 2, 2003.

BACKGROUND OF THE INVENTION

1. Field of the Invention

The present invention relates to a disk apparatus for driving optical disks (for example, CD-R/RW, DVD-R/RW/RAM/+R/+RW, etc.) as recording media for recording a large amount of data in various computer systems.

2. Description of the Related Art

In general, disk apparatuses built in personal computers (hereinafter, referred to as PCs) use disk trays for loading optical disks that move forward and backward. The optical disks loaded into the disk trays are driven in the main bodies of the disk apparatuses to record or reproduce data.

On the other hand, a slot-in type disk apparatus without using the disk tray has been widely used to reduce the thickness and size of the PC. Since the slot-in type disk apparatus does not use a disk tray for loading and unloading an optical disk into the main body thereof, a user inserts a half or more of the optical disk into a slot, and the optical disk is then automatically loaded by the operation of a mechanism into the main body of the apparatus.

Once the optical disk is loaded into the main body of the disk apparatus, it is mounted on a turntable to rotationally drive the optical disk. Usually, in this construction, a clamp head formed integrally with the turntable goes up to a prescribed position and clamps a central hole of the optical disk.

FIG. 18 is a diagram illustrating the operation of the clamp head as it clamps onto the optical disk in a conventional slot-in type disk apparatus. In the configuration shown in FIG. 18, a driven pin 103 provided at the side surface of a frame member 101 is located at a straight part of a cam groove 102a while a slide member 102 is moving until it reaches the state shown in FIG. 18A, and thus the frame member 101 is kept in a down state. However, when the slide member 102 is further moved, the camp groove 102a pushes up the driven pin 103 from the state shown in FIG. 18(A) to the state shown in FIG. 18(B), so that a clamp head 105 attached to a motor shaft of a spindle motor 104 fixed to the frame member 101 is inserted into the central hole of the optical disk D. Then, the spindle motor 104 is raised so that the optical disk D is interposed between a turntable 107 and a convex portion 106a formed in a cover chassis 106. At this time, the clamp head 105 is completely inserted into the central hole of the optical disk D, and a chuck claw 105a of the clamp head 105 holds the optical disk on the turntable 107.

Then, when the cam groove 102a is moved to the state shown in FIG. 18(C), the frame member 101 is separated from the convex portion 106a together with the optical disk D held by the clamp head 105 and goes down a little. At that time, by driving the spindle motor 104 at the above height, the optical disk D is driven so that the recording and reproduction of data on the optical disk D is started (for example, see Patent Document 1).

[Patent Document 1]—Japanese Unexamined Patent Application Publication No. 2002-117604

In the disk apparatus constructed in this way, the upward and downward movement of the clamp head 105 is based on the driven pin 103 that is moved up and down corresponding to the horizontal reciprocation of the slide member 102, and thus the driven pin 103 should be accurately guided into the cam groove 102a. For this reason, the clearance between the driven pin 103 and the cam groove 102a should be kept in a so-called rigid state where a frictional resistance is not generated.

On the other hand, the frame member 101 is provided with the spindle motor 104, the turntable 207, the clamp head 105, and a head unit for applying a laser beam to the optical disk D. An objective lens of the head unit that is composed of a tracking coil and a focus coil for accurately forming a beam spot on the pits of the optical disk is supported in a cantilever state and is servo-controlled. Therefore, external vibrations are most easily applied to the objective lens of the head unit, and sufficient consideration for vibrations must be taken for the objective lens.

Therefore, in the conventional disk apparatus, a buffering structure is provided for axially supporting the frame member 101 using a plurality of elastic members. The buffering structure is also employed in a conventional slot-in type disk apparatus. However, in the buffering structure, only the vibrations generated horizontally are buffered not the vibrations generated vertically.

That is, as described above, the frame member 101 should always be accurately moved up and down, and thus the driven pin 103 and the cam groove 102a are made rigid. From an inverted point of view, unnecessary up-and-down movement is prevented in this construction, and the up-and-down movement of the frame member 101 is actively prevented. In this state, the frame member 101 cannot absorb impacts generated in a vertical direction. Therefore, vertical impacts are directly transferred to the frame member 101, and thus the above construction is not sufficient as a buffering structure.

SUMMARY OF THE INVENTION

Accordingly, the present invention is designed to solve the above problems, and it is thus an object of the present invention to provide a high-reliability slot-in type disk apparatus having a buffering function against vibrations vertically generated in recording and reproducing data on an optical disk.

Therefore, in order to accomplish the above object, the present invention provides the following means. That is, according to a first aspect of the present invention, there is provided a disk apparatus comprising a lift mechanism for lifting up and down a clamp head so as to be attached to and detached from an optical disk, wherein a driven pin is guided along a cam groove formed in the lift mechanism and is elastically supported at an end portion of the cam groove.

According to a second aspect of the present invention, in the disk apparatus according to the first aspect, a double cam groove structure is provided in which, when the driven pin provided with an elastic ring reaches the end portion of the cam groove of the lift mechanism, the driven pin is separated from the cam groove, and the elastic ring comes into close contact with the cam groove.

According to a third aspect of the present invention, in the disk apparatus according to the first aspect, a shaft-support member is provided at the end portion of the cam groove so as to be elastically supported.

According to a fourth aspect of the present invention, in the disk apparatus according to the first aspect, a flexible shaft-support member is provided at the end portion of the cam groove.

According to a fifth aspect of the present invention, there is provided a disk apparatus comprising a lift mechanism for lifting up and down a clamp head so as to be attached to and detached from an optical disk, wherein a driven pin guided along a cam groove formed in the lift mechanism is regulated and supported by the cam groove in the course of reaching an end portion of the cam groove, and the driven pin is elastically supported at the end portion.

BRIEF DESCRIPTION OF THE DRAWINGS

The above and other features and advantages of the present invention will become more apparent from a detailed description of the exemplary embodiments thereof with reference to the accompanying drawings in which.

DESCRIPTION OF THE PREFERRED EMBODIMENT

Now, preferred embodiments of the present invention will be described in detail with reference to the accompanying drawings.

Figure 1:
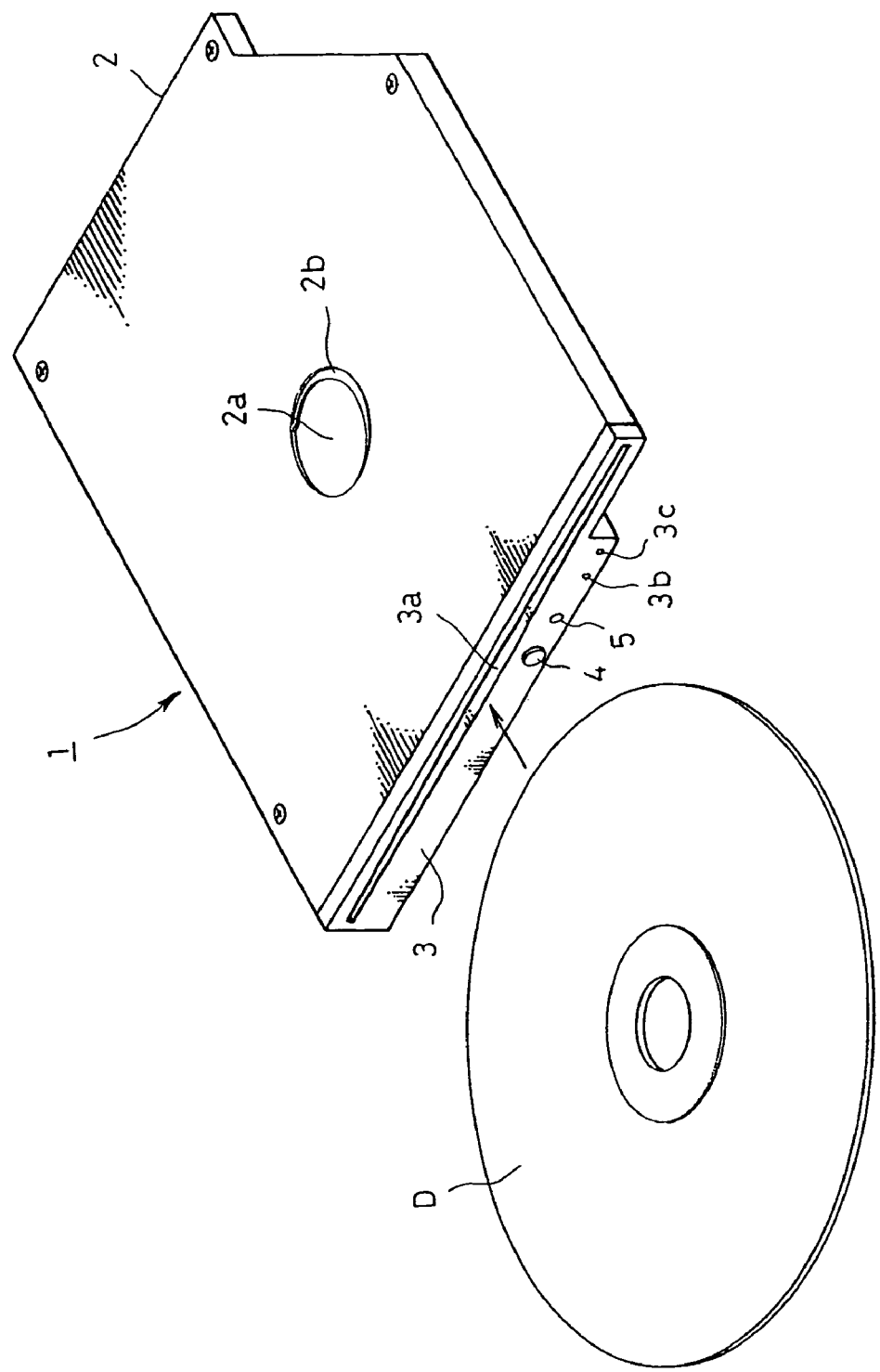
FIG. 1 is a perspective view illustrating the appearance of a disk apparatus according to an embodiment of the present invention.

FIG. 1 is a perspective view illustrating the appearance of a disk apparatus 1 according to the present invention. An opening 2a is formed at the center of the top panel of a chassis case 2 formed in a sealed state, and a convex portion 2b projecting inwardly is formed in a circumference of the opening 2a. A bezel 3 is fixed to the front end of the chassis case 2, and a slot 3a into which an optical disk D is inserted and through holes 3b and 3c for emergency release are formed in the bezel 3. In addition, the bezel 3 comprises a push button 4 for signaling external unloading of the inserted optical disk D and an indicator 5 for displaying the operational condition of the disk apparatus 1.

Figure 2:
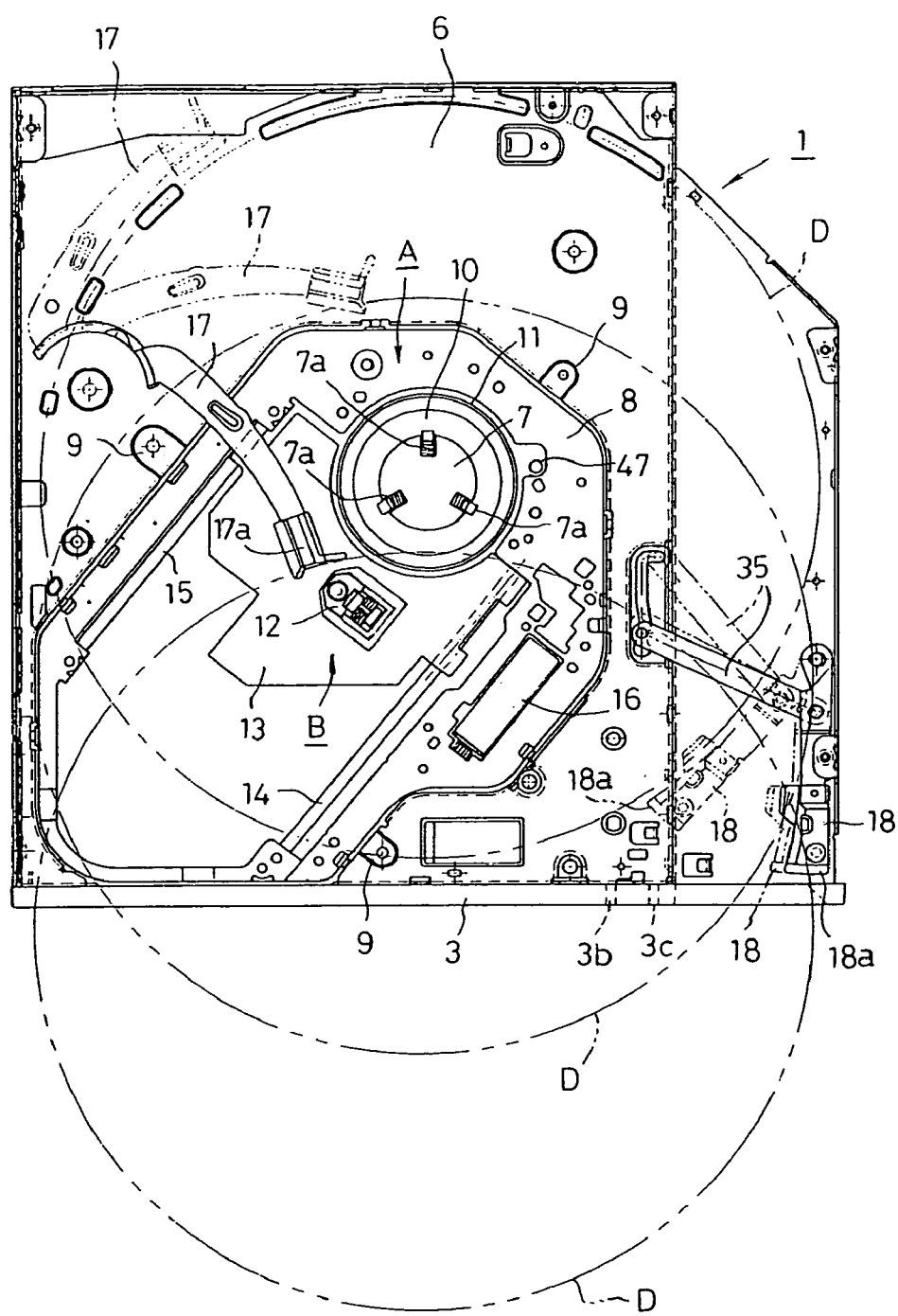
FIG. 2 is a plan view illustrating the inner configuration of the disk apparatus shown in FIG. 1.
Figure 3:
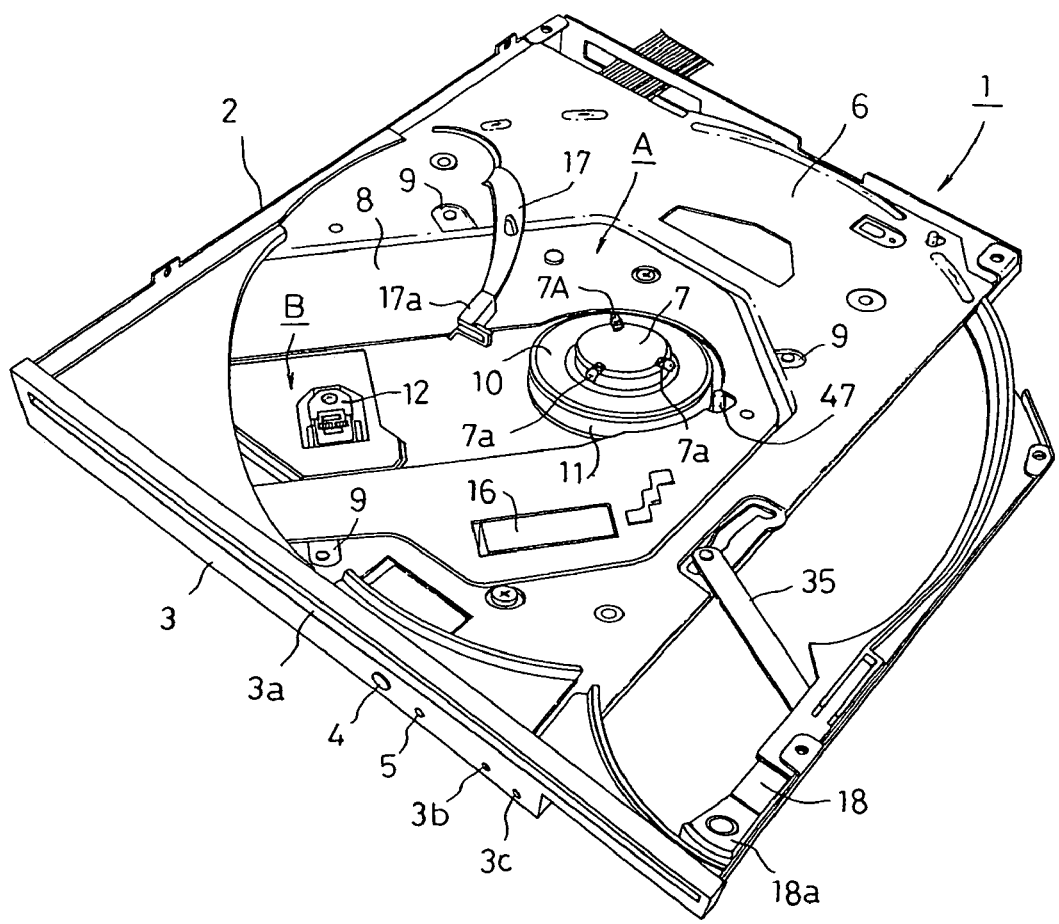
FIG. 3 is a perspective view illustrating the inner configuration of the disk apparatus shown in FIG. 1.

FIG. 2 is a plan view illustrating a state in which the top panel of the disk apparatus 1 is removed, and FIG. 3 is a perspective view illustrating the above state. In the figures, a base panel 6 is provided in the chassis case 2, and a driving system unit A for the optical disk D is provided in the direction inclined from the center of the base panel 6. In this driving system unit A, in order to clamp a central hole of the optical disk D or release the central hole when the optical disk D is loaded into or unloaded from the chassis case 2, a frame member 8 capable of moving up and down is connected to the base panel 6 at several positions (three positions in this embodiment) through a well-known buffering support structure (see the enlarged view of FIG. 4). As the driving structure of the frame member 8, a structure has been known in which one end of the frame member 8 is axially supported in a cantilever state and the front end thereof is moved to allow the clamp head to go up and down. However, in the embodiment of the present invention, a structure in which the frame member 8 moves up and down in a horizontal state is employed, so that it allows for a reduction of thickness.

At the front end of the frame member 8, a clamp head 7 is provided at a position corresponding to the center of the optical disk D which is loaded and stopped. The clamp head 7 is integrally formed with a turntable 10 and is fixed to a driving shaft of a spindle motor 11 provided immediately below the turntable 10. Therefore, the optical disk D clamped by the clamp head 7 is rotationally driven by means of the spindle motor 11 to record and reproduce data.

Next, reference numeral B denotes a head unit supported by the frame member 8, and the head unit is fixed to a carrier block 13 for reciprocating an optical pickup device 12 in a diametrical direction of the optical disk D. The carrier block 13 is supported by both guide shafts 14 and 15 that are fixed to the frame member 8 and reciprocates by means of a sled motor 16 and a gear unit (not shown).

Figure 4:
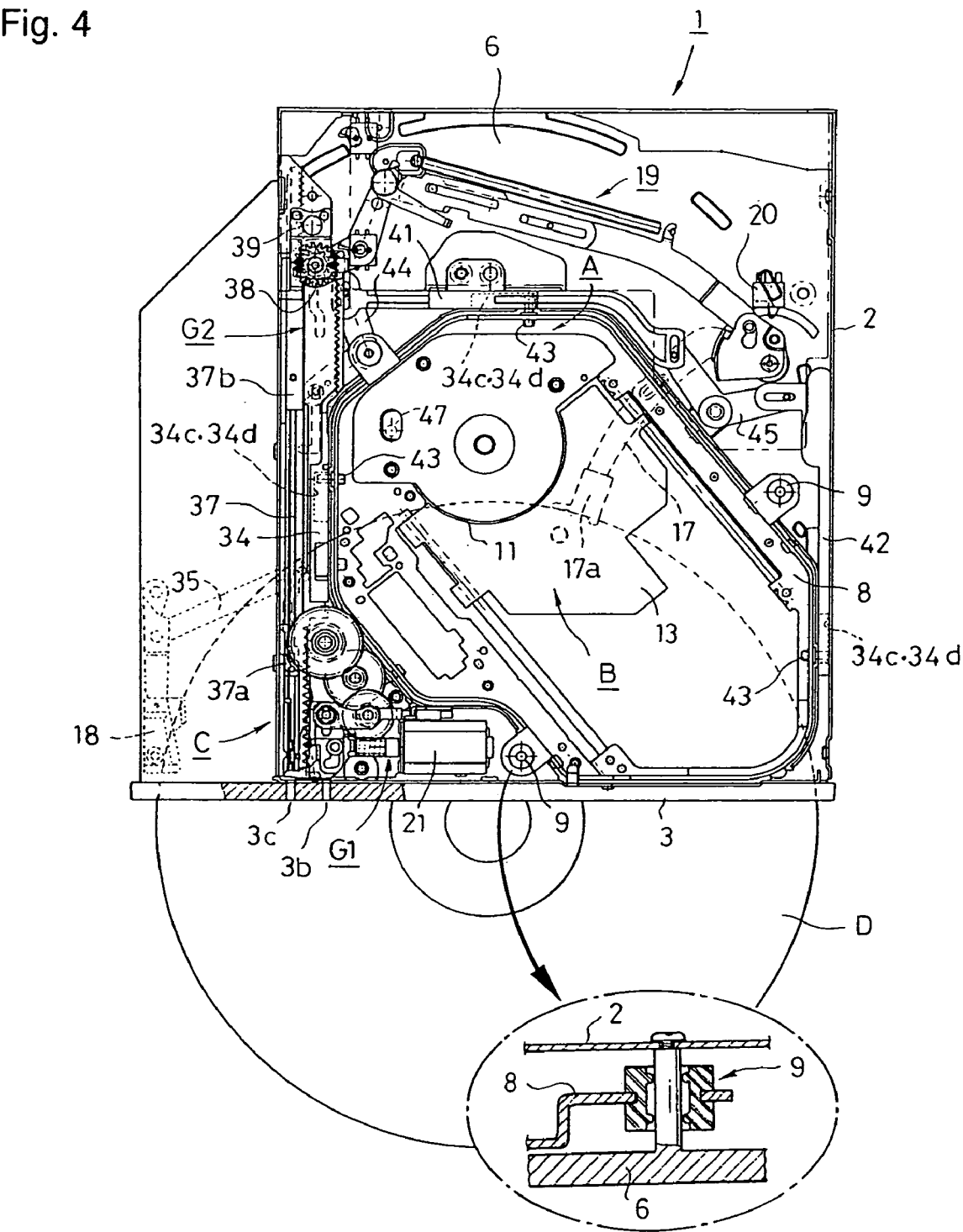
FIG. 4 is a diagram illustrating the inner configuration on a bottom surface of the disk apparatus shown in FIG. 1.

Reference numeral 17 denotes an ejecting lever for ejecting the optical disk D from the chassis case 2 to the outside, and reference numeral 18 denotes a guide lever for carrying the inserted optical disk D into the chassis case 2. The front ends 17a and 18a of the ejecting lever 17 and the guide lever 18 are differentially moved by means of a link mechanism 19, as shown in FIG. 4.

That is, as shown in FIG. 2, when the optical disk D is inserted through the slot 3a of the bezel 3, the front end of the optical disk D first comes into contact with the front end 17a of the ejecting lever 17. Then, when the optical disk D is inserted further, the front end 17a of the ejecting lever 17 is moved back, and then a limit switch 20 shown in FIG. 4 operates. Then, on the basis of a signal of the limit switch, a carrying mechanism C, which will be described later, of the optical disk D starts driving.

Figure 5:
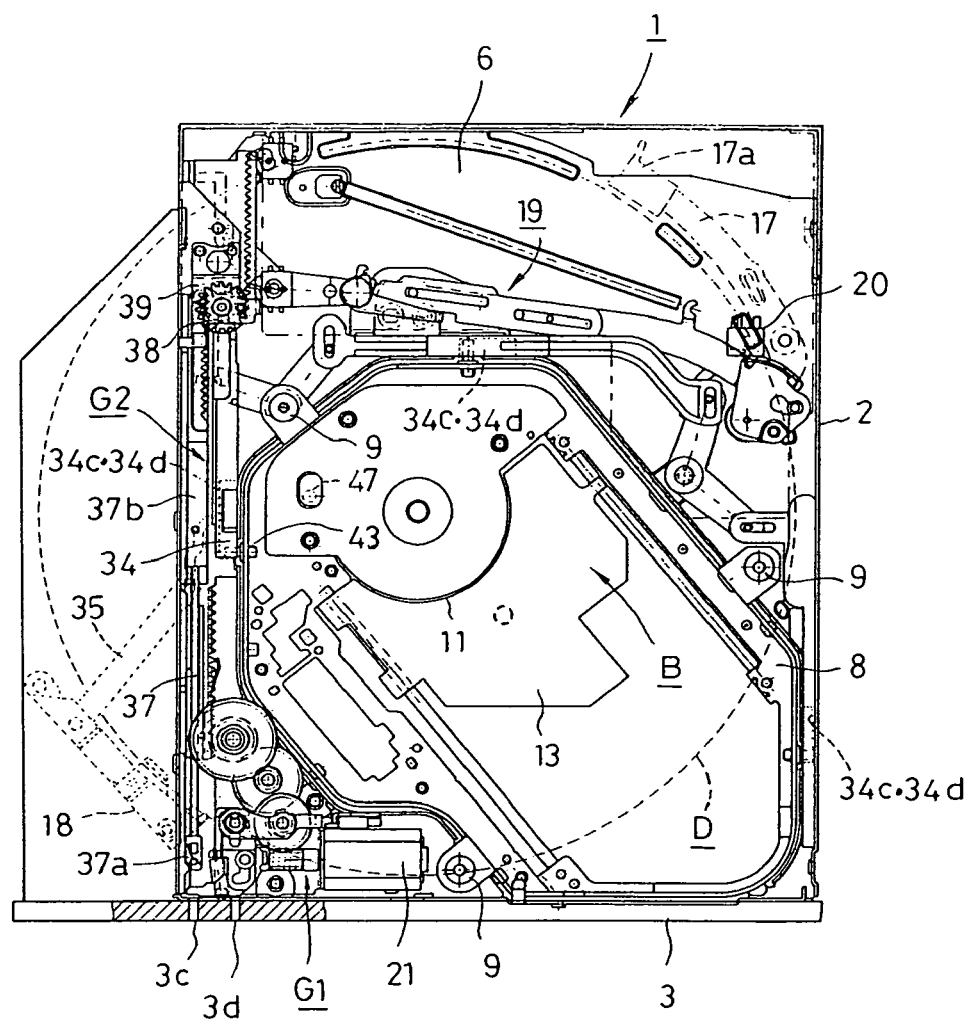
FIG. 5 is a diagram illustrating the operation of the disk apparatus shown in FIG. 1.

In this state, the guide lever 18 is moved by means of the operation of the carrying mechanism C, so that the front end 18a thereof comes into contact with the rear end of the optical disk D, and the optical disk D is guided into the chassis case 2. Then, as shown in FIG. 5, the optical disk D is finally stopped at a position where the central hole of the optical disk D matches up with the clamp head 7, and the central hole of the optical disk D is clamped by the clamp head 7 through the vertical movement of the clamp head 7.

On the other hand, when the optical disk D guided into the chassis case 2 in this way is unloaded, the carrying mechanism C is driven in the opposite direction after the push button 4 of the bezel 3 is pushed or on instruction from the PC. Accordingly, the ejecting lever 17 carries the optical disk D from the front end 17a of the ejecting lever 17 to the position shown in FIG. 4.

Figure 6:
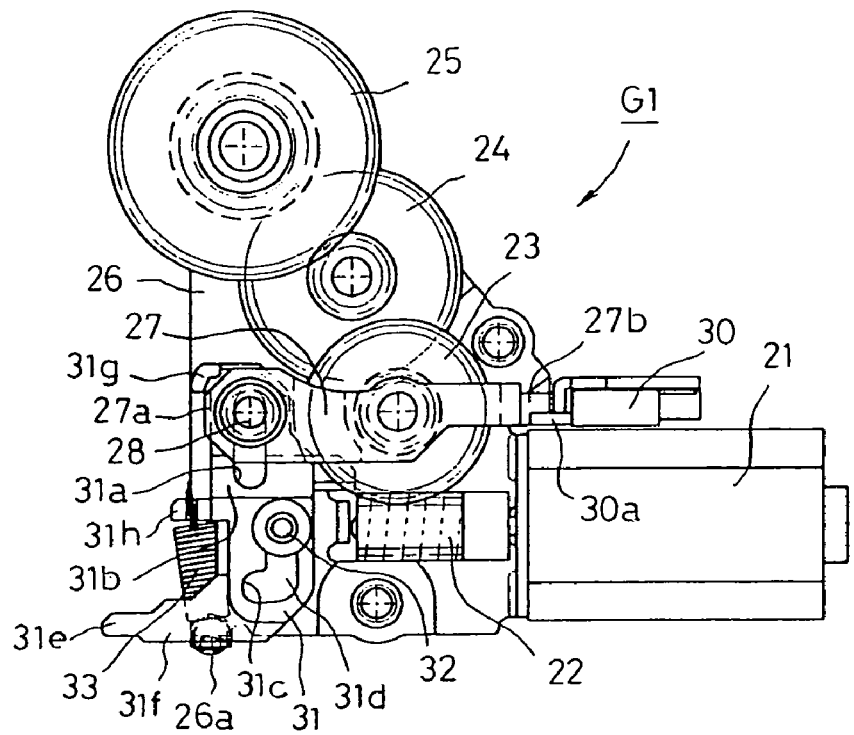
FIG. 6 is a diagram illustrating a loading gear unit.
Figure 6:
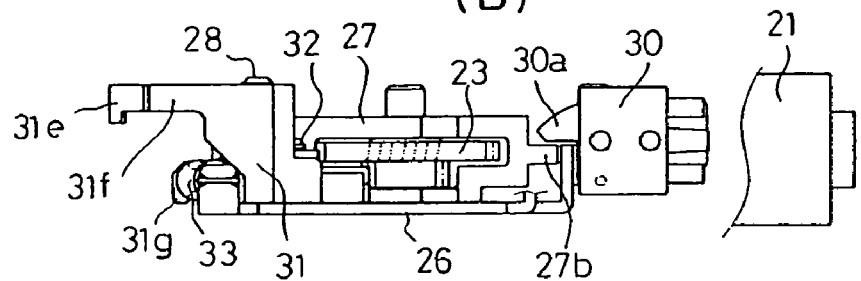
Figure 6:
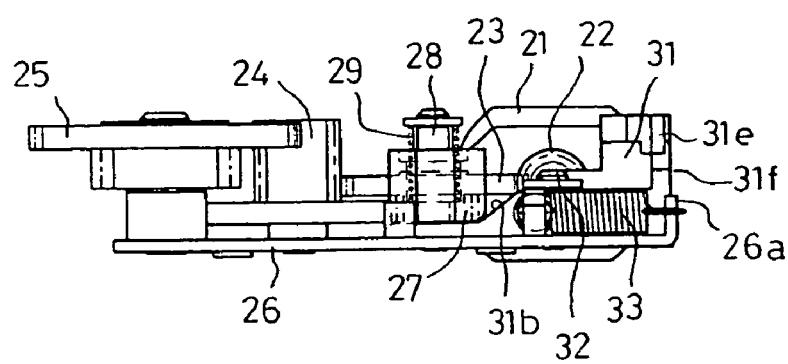
Figure 7:
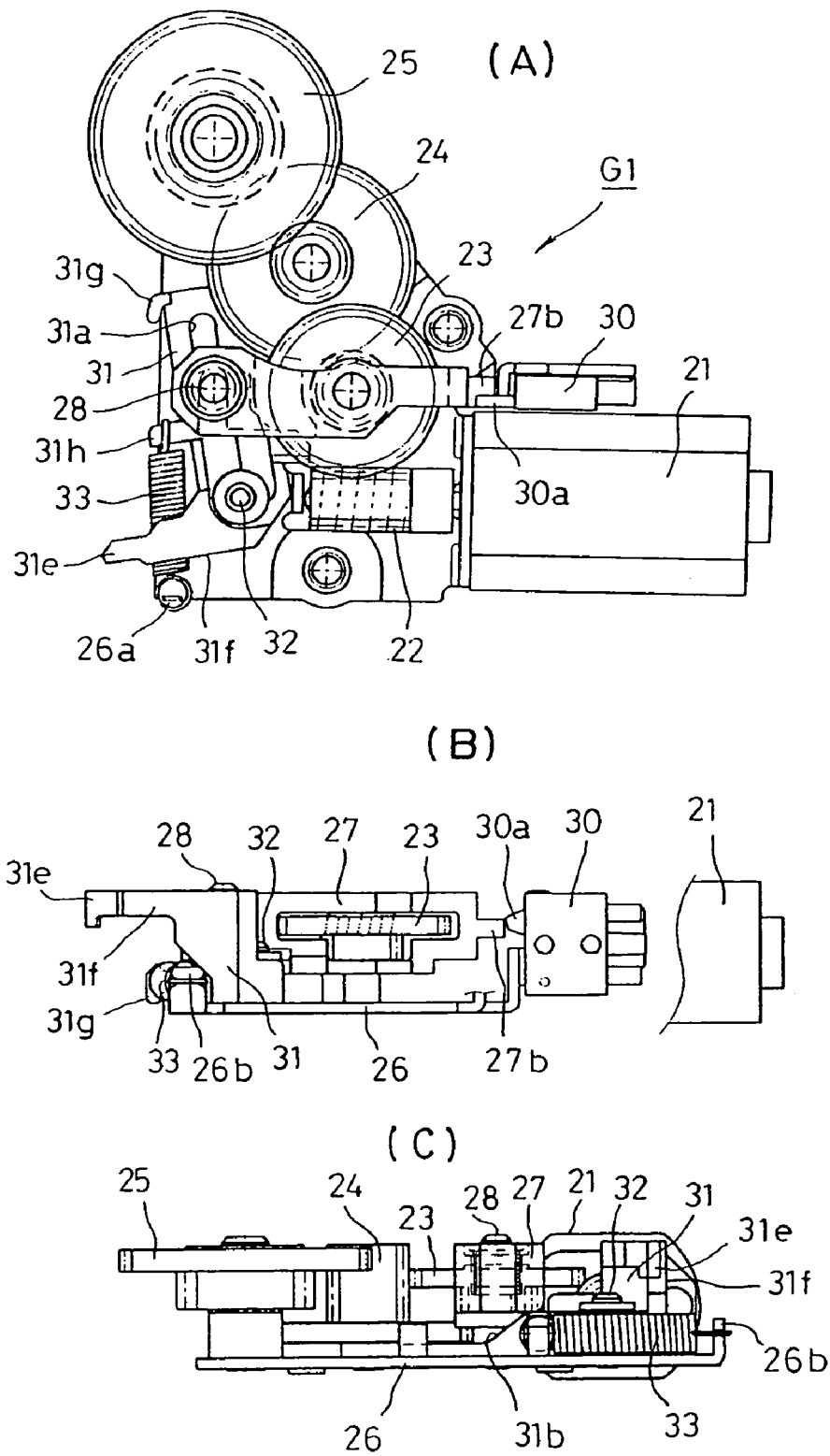
FIG. 7 is a diagram illustrating the operation of the loading gear unit.

Next, the configuration of the carrying mechanism C for loading and unloading the optical disk D through the aforementioned automatic manipulation will be described. The carrying mechanism C is largely formed of a combination of a loading gear unit G1 and a rack gear unit G2. FIGS. 6 and 7 are diagrams illustrating the configuration and operation of the loading gear unit G1. In the figures, reference numeral 21 denotes a loading motor, which is a power source for automatic manipulation, and a worm gear 22 is fixed to an output shaft of the loading motor 21 so as to rotate coaxially with the loading motor 21. The rotary power of the worm gear 22 is sequentially transferred to double gears 23, 24, and 25 axially supported by a gear base 26: that is, from a small-diameter gear to a large-diameter gear, thereby gradually decreasing the speed of rotation of the double gears.

In this gear construction, the double gear 23 has a release mechanism for disengaging from the worm gear 22. A pivotal support pin 28 is inserted into an end portion 27a of a holder 27 for holding the double gear 23 and sliding up and down, and the end portion is urged downward and is axially supported by means of a compression coil spring 29. Therefore, in a normal state, as shown in FIG. 6(C), the worm gear 22 and the double gear 23 normally engage with each other. Furthermore, a dog head 27b is formed at the other end portion of the holder 27 on the loading motor 21 side, so that a knob 30a of the limit switch 30 fixed to the gear base 26 can be manipulated.

The lower surface of the end portion 27a of the holder 27 is provided with a slider member 31 supported coaxially with the pivotal support pin 28. A longitudinal groove 31a is formed at a portion of the slider member 31 axially supported by the pivotal support pin 28, so that the slider member 31 can slide in a direction perpendicular to the end portion 27a of the holder 27. An inclined surface 31b is formed between the front end and the rear end of the slider member 31. Therefore, when the slider member 31 is moved forward, the inclined surface 31b presses the end portion 27a of the holder 27 from the bottom surface, thereby raising the entire holder 27.

A longitudinal groove 31d having an engaging step portion 31c to be axially supported by the pivotal support pin 32 is formed at the rear end portion of the slider member 31, and an operational piece 31f having a closing projection 31e is also formed at the rear end. On the other hand, a reset piece 31g to be started depending upon the movement of the rack gear unit G2 is formed at the front end portion of the slider member 31.

A tension coil spring 33 which gives a toggle function is provided at a tilt angle between a hook piece 31h of the slider member 31 integrally constructed in this way and a hook piece 26a of the gear base 26, so that the slider member 31 is biased to move backward and to rotate counterclockwise.

Since the slider member 31 is constructed as described above, the slider member 31 uses the pivotal support pin 28 as a supporting point in the normal state shown in FIG. 6. In this state, when the slide member 31 is pushed and advanced from its rear end portion and the engaging step portion 31c of the longitudinal groove 31d reaches the position of the pivotal support pin 32, the slider member 31 is rotated about the pivotal support pin 28 by means of the tension of the tension coil spring 33, the engaging step portion 31c engages with the pivotal support pin 32 as shown in FIG. 7 to turn to a locked state, and it is locked.

Figure 8:
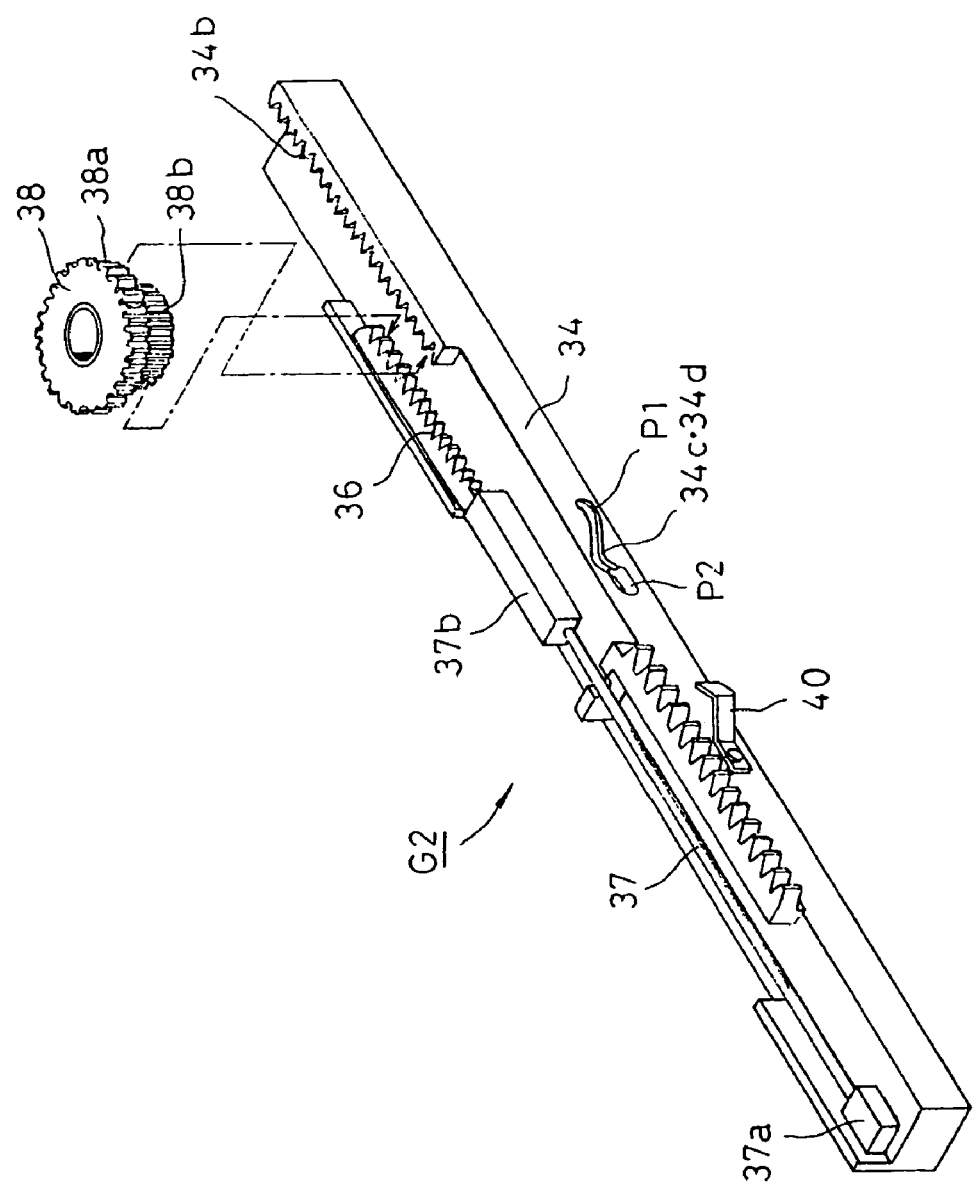
FIG. 8 is a perspective view illustrating the configuration of a rack gear unit.

Next, in the rack gear unit G2, as shown in FIG. 8, gear trains 34a and 34b are integrally formed with a rack main body 34, and the gear train 34a engages with the small-diameter gear of the double gear 25 in the loading gear unit G1. As a result, the rack main body 34 is moved forward and backward in the chassis case 2 by the loading motor 21. In this way, by the rack main body 34 moving forward and backward, the link mechanism 19 connected to the front end of the rack main body 34 is driven, and the ejecting lever 17 moves. Furthermore, as shown in FIG. 2, a lever member 35 connected to the rack main body 34 on the surface of the base panel 6 moves the guide lever 18.

On the rack main body 34 constructed in this way, a gear member 36 is arranged at the front end of the rack main body so as to freely move forward and backward, and a push pin 37 having blocks 37a and 37b in the front and the rear thereof is also arranged to push and advance the gear member 36. The gear train 34b and the gear member 36 respectively engage with a double gear 38 that is rotatably attached to a gear frame 39. In this case, the large-diameter gear 38a of the double gear 38 engages with the rear end of the gear train 34b, and the small-diameter gear 38b engages with the front end of the gear member 36 which is integrally formed with the block 37b.

As a result, since the double gear 38 is rotated to a prescribed position when the gear member 36 is advanced by external force applied through the push pin 37, the rotary power of the large-diameter gear 38a is transferred to the gear train 34b, so that the rack main body 34 is moved backward. Reference numeral 40 denotes an operational piece for pushing the reset piece 31g formed at the front end portion of the slider member 31 of the aforementioned loading gear unit G1. In a case in which the loading gear unit G1 is in the state shown in FIG. 7, when the operational piece 40 pushes the reset piece 31g of the slider member 31, the engagement of the pivotal support pin 32 with the engaging step portion 31c is released, so that it returns to the state shown in FIG. 6.

An important portion of the present invention, that is, the lift mechanism of the frame member 8 comprises the rack main body 34, slide members 41 and 42 being moved forward and backward in synchronism with the rack main body 34, and driven pins 43 guided into cam grooves formed in the rack main body 34 and the slide member 41 and 42. The slide member 41 is connected to the rack main body 34 by means of a link member 44, and the slide member 41 is also connected to the slide member 42 by means of a link member 45, whereby the rack main body 34 and the slide members 41 and 42 are synchronously moved forward and backward.

The driven pins 43 fixed to the frame member 8 are arranged such that the open ends thereof are fitted into the cam grooves formed in the rack main body 34 and the slide members 41 and 42, respectively. Since the fitting relationship between the driven pins 43 and the cam grooves are common to each other, the fitting relationship between the cam groove of the rack main body 34 and the driven pins 43 will be described as an example.

First, in the first embodiment of the present invention shown in FIGS. 9 through 15, the driven pin 43 fixed to the frame member 8 is provided with a flexible elastic ring 46. On the other hand, the cam groove formed in the rack main body 34 is formed of a double cam groove structure comprising a cam groove 34c which slides and guides the driven pin 43, and a cam groove 34d formed so as not to come into contact with the elastic ring 46 in the process of guiding the driven pin 43 along the cam groove 34c.

At an end portion P2 of the cam grooves 34c and 34d, the cam groove 34d has a diameter almost equal to that of the elastic ring 46 to hold the elastic ring 46. Further, the cam groove 34c is terminated in the vicinity of the entry of the end portion P2 and is opened toward the end portion P2. As a result, in the range in which the cam groove 34c is formed, the driven pin 43 is regulated and supported by the cam groove 34c, and when the driven pin 43 reaches the end portion P2, the driven pin 43 is supported by the elastic ring 46.

Figure 9:
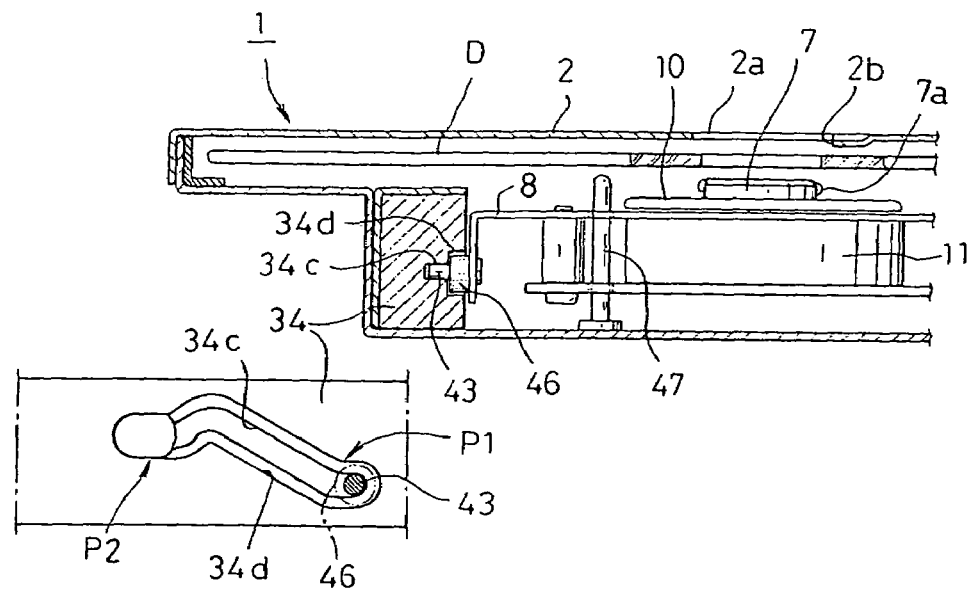
FIG. 9 is a diagram illustrating a first process of a lift mechanism according to the present invention.

Next, an operational aspect of the lift mechanism of the frame member 8 constructed in this way will be described with reference to process diagrams shown in FIGS. 9 to 15. FIG. 9 illustrates the most initial state in which the optical disk D is inserted into the disk apparatus 1 and the central hole of the optical disk D is positioned so as to directly face the clamp head. In this state, since the driven pin 43 is positioned at a starting end portion P1 of the cam groove 34c, the frame member 8 is located at the lowest position, and the clamp head 7 is ready for to be lifted.

Figure 10:
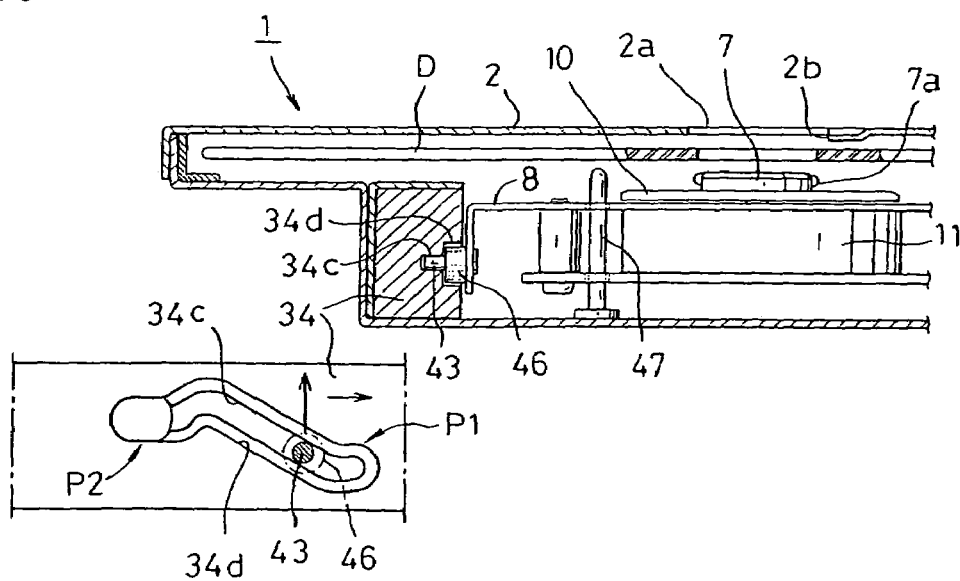
FIG. 10 is a diagram illustrating a second process of the lift mechanism according to the present invention.

In the state shown in FIG. 9, as shown in FIG. 4, the rack main body 34 is most advanced. When the rack main body 34 starts moving backward from that position, the driven pin 43 is guided along the cam groove 34c and is sequentially moved up as shown in FIG. 10, whereby the frame member 8 and the clamp head 7 start moving upward.

Figure 11:
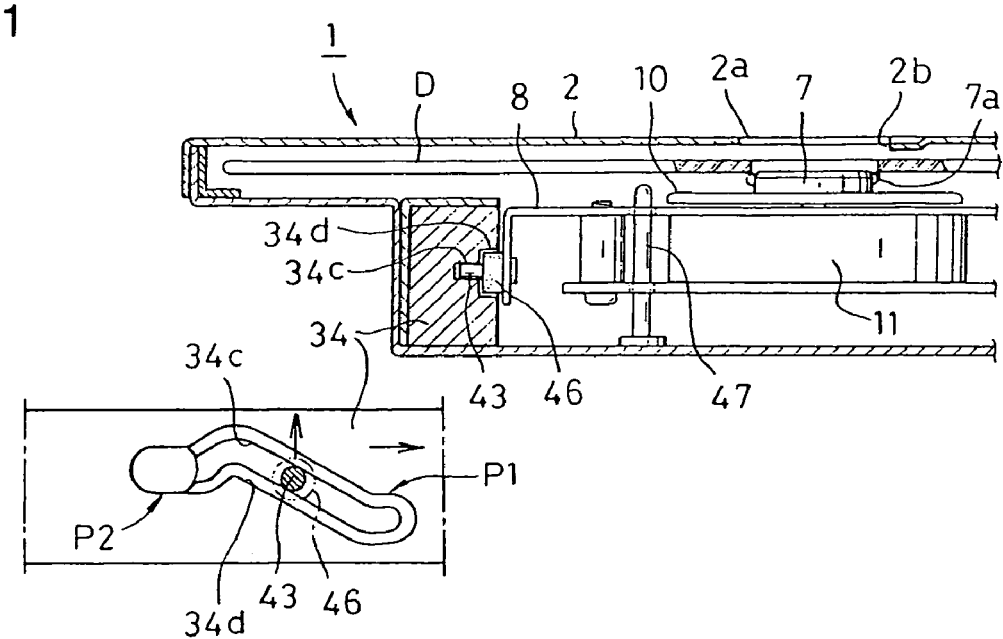
FIG. 11 is a diagram illustrating a third process of the lift mechanism according to the present invention.
Figure 12:
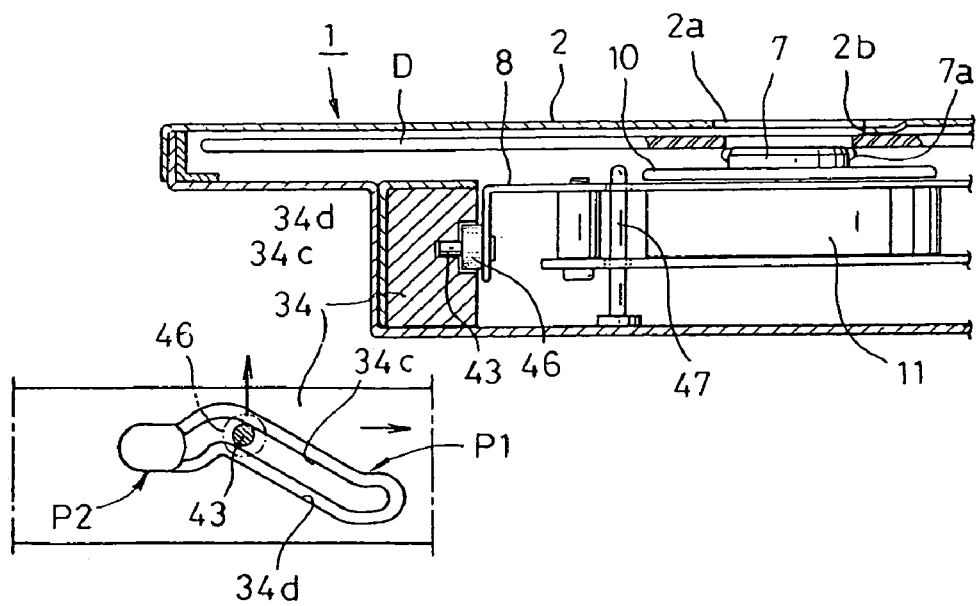
FIG. 12 is a diagram illustrating a fourth process of the lift mechanism according to the present invention.
Figure 13:
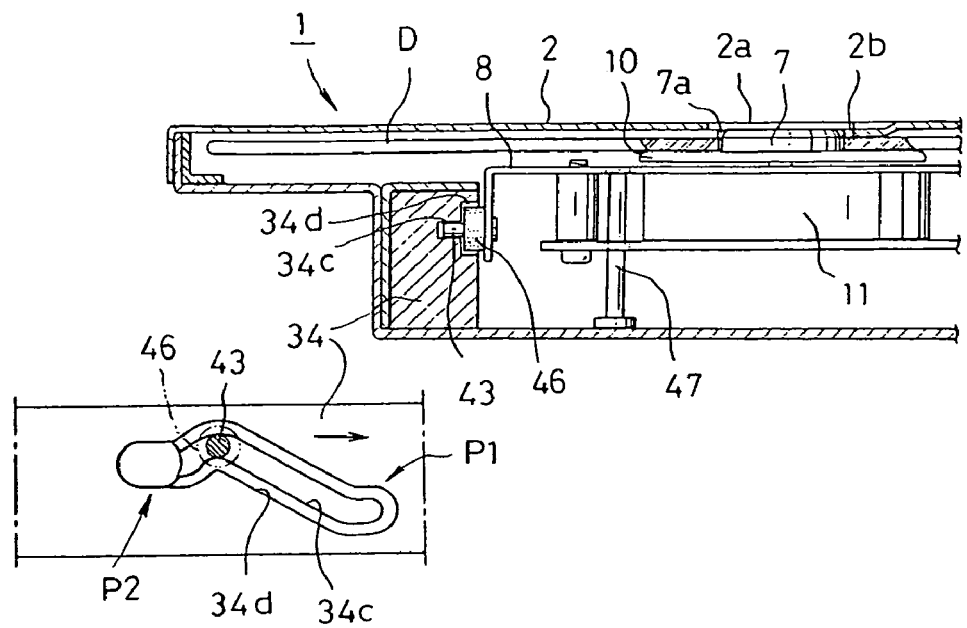
FIG. 13 is a diagram illustrating a fifth process of the lift mechanism according to the present invention.

Then, when the driven pin 43 being guided in the cam groove 34c is moved up as shown in FIG. 11, a chuck claw 7a of the clamp head 7 comes into contact with an opening end portion of the central hole of the optical disk D. In this state, when the clamp head 7 goes up as shown in FIG. 12, the chuck claw 7a pushes the optical disk D upward, so that the opening end of the central hole is pressed onto the convex portion 2b of the opening 2a of the chassis case 2. Then, when the driven pin 43 is guided and reaches the peak portion of the cam groove 34c as shown in FIG. 13, the clamp head 7 is inserted into the central hole of the optical disk D, and the chuck claw 7a is locked with the opening end of the optical disk D. In this way, the optical disk D is fixed onto the turntable 10.

Figure 14:
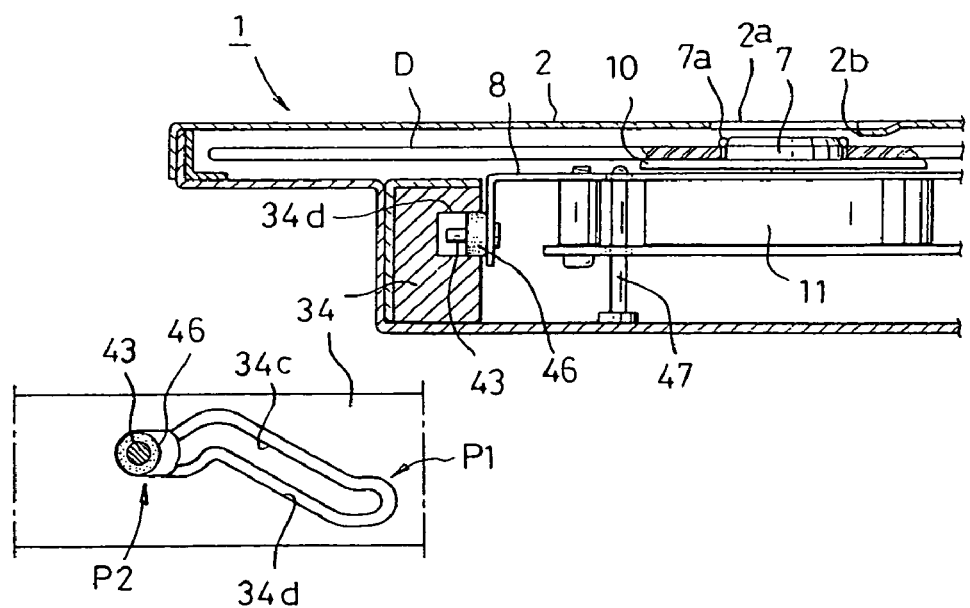
FIG. 14 is a diagram illustrating a sixth process of the lift mechanism according to the present invention.

In this state, when the rack main body 34 is moved further back, the frame member 8 goes down. Then, as shown in FIG. 14, the elastic ring 46 is received in the end portion P2. In this way, the driven pin 43 is separated from the cam groove 34c, so that the regulative support by the cam groove 34c is released and the driven pin 43 is elastically supported by the elastic ring 46. As a result, a buffering function for the frame member 8 is obtained.

Figure 15:
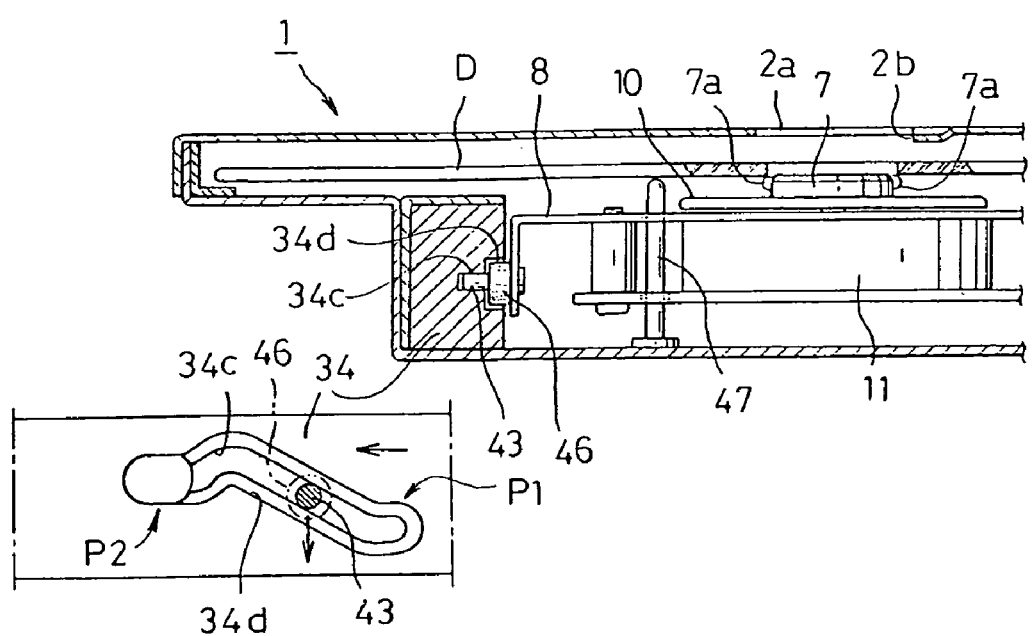
FIG. 15 is a diagram illustrating a seventh process of a lift mechanism according to the present invention.

FIG. 15 is a diagram illustrating the process of ejecting the optical disk D. Here, the driven pin 43 undergoes the reverse processes by means of advancement of the rack main body 34, and the optical disk D is separated from the clamp head 7 by means of the operation of a release pin 47 in the process of reaching the starting end portion P1, so that the optical disk D can be unloaded.

Figure 16:
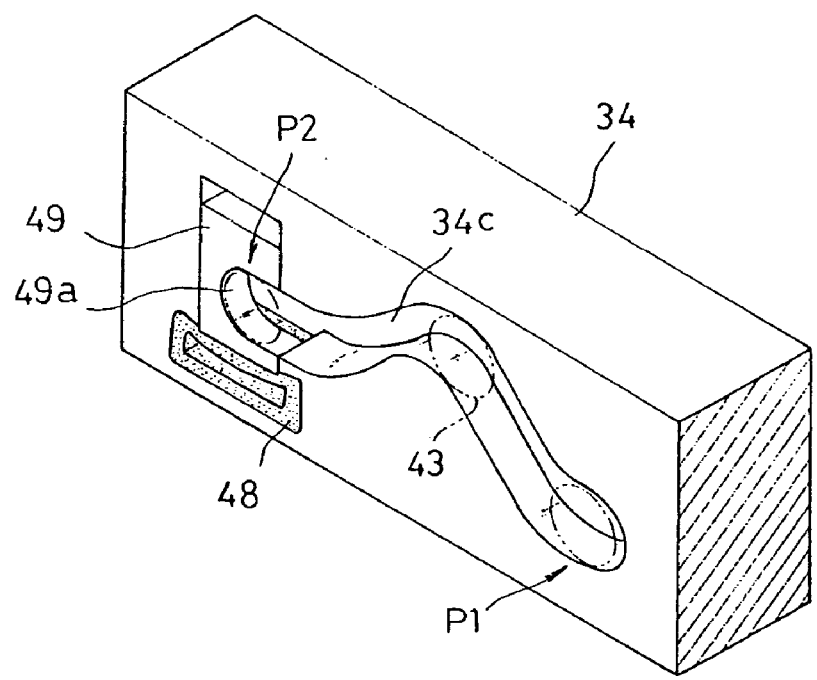
FIG. 16 is a perspective view illustrating a second embodiment according to the present invention.

FIG. 16 shows a second embodiment of the present invention, in which only the cam groove 34c for regulating and supporting the driven pin 43 is formed in the rack main body 34, and the end portion P2 is provided with a shaft supporting member 49 fixed to and supported by an elastic member 48. A cam groove 49a connected to the cam groove 34c is formed in the shaft-supporting member 49. When the driven pin 43 reaches the cam groove 49a, the driven pin 43 is elastically supported by the shaft-supporting member 49 under the operation of the elastic member 48, so that the buffering function for the frame member 8 is obtained. Therefore, according to the second embodiment of the present invention, even when the elastic member 48 is elastically deformed, the contact area between the shaft supporting member 49 and the elastic member 48 stays constant. As a result, a variation of the buffering function characteristic when the elastic member 48 is deformed can be suppressed, and good buffering can always be obtained.

Figure 17:
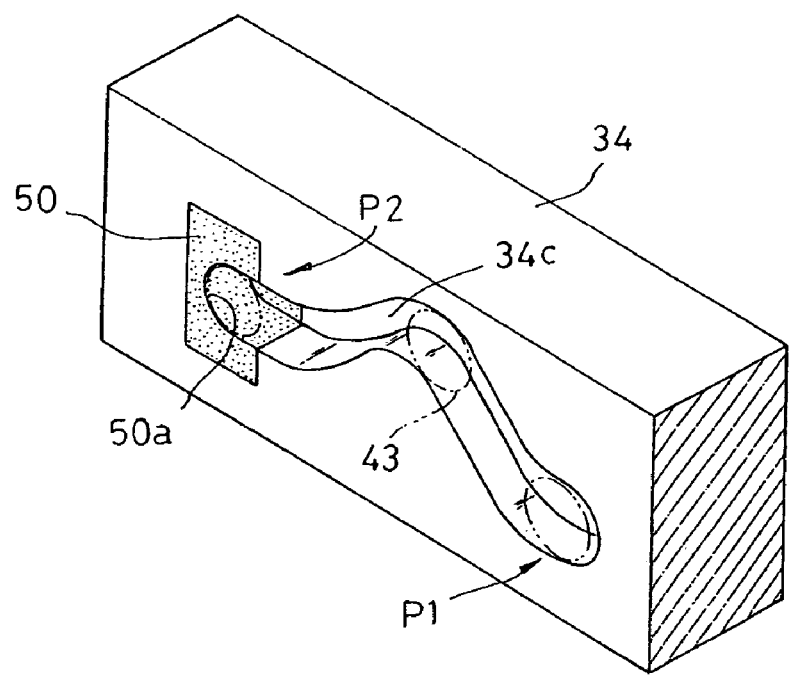
FIG. 17 is a perspective view illustrating a third embodiment according to the present invention.
Figure 18:
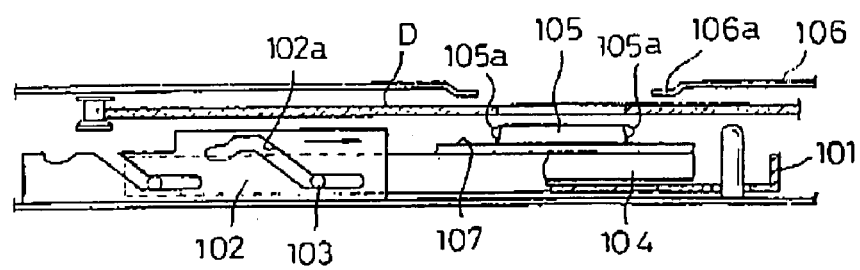
FIG. 18(A), (B), and (C) are diagrams illustrating the configuration of a conventional disk apparatus.
Figure 18:
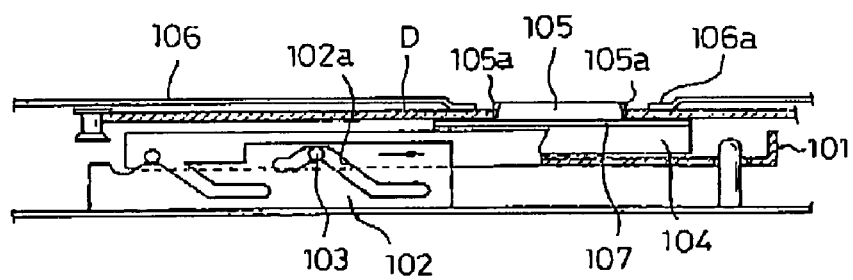
Figure 18:
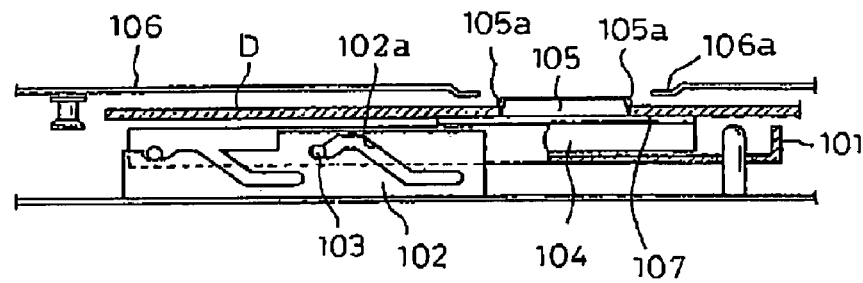

FIG. 17 shows a third embodiment of the present invention. In this case, only the cam groove 34c for regulating and supporting the driven pin 43 is formed in the rack main body 34, a cam groove 50a connected to the cam groove 34c is formed at the end portion P2, and a flexible shaft-supporting member 50 is also provided at the end portion P2. Therefore, when the driven pin 43 reaches the cam groove 50a, the driven pin 43 is elastically supported by the shaft support member 50. As a result, a buffering function for the frame member 8 can be obtained.

As described above, according to the constructions of the embodiments of the present invention, when recording and reproduction data on the optical disk D, the frame member 8 is supported in a buffered state. Thus, a disk apparatus with an improved vibration resistance and high reliability can be implemented. Further, when fixing and releasing the optical disk D on the turntable 10, the frame member 8 is supported in a rigid state. Therefore, vertical displacement due to the buffering function need not be considered, so that it is possible to decrease the driving stroke of the frame member 8 in fixing and releasing the optical disk D. Furthermore, since the frame member 8 returns to the rigid state after unloading the optical disk D, the disk apparatus is influenced by vibrations, for example, in transit. Thus, it is possible to enhance impact resistance.

As described above in detail, according to the first through fourth aspects of the present invention, since the driven pin for moving up and down the frame member is elastically supported at the end portion of the cam groove for guiding the driven pin, the vertical buffering function can be obtained in the process of recording and reproducing data on the optical disk. Therefore, it is possible to implement a disk apparatus with an improved vibration resistance and high reliability.

Furthermore, according to the fifth aspect of the present invention, the driven pin is regulated and supported by the cam groove in the process of reaching the end portion of the cam groove, and thus the clamp head can be accurately moved up and down. Moreover, the buffering function for elastically supporting the driven pin at the end portion of the cam groove can be obtained. Therefore, it is possible to implement a lift mechanism with reasonable functions.

What is claimed is:

1. A disk apparatus comprising a lift mechanism for raising and lowering a clamp head so as to be, respectively, attached to and detached from an optical disk,
    wherein a driven pin, having an elastic ring and a first portion, is guided along a cam groove, having a double cam groove structure, formed in the lift mechanism and is elastically supported by the elastic ring, which is in close contact with a portion of the double cam groove structure, at an end portion of the cam groove and when the driven pin reaches the end portion of the cam groove, the first portion of the driven pin is separated from the guiding cam groove.

2. The disk apparatus according to claim 1,
    wherein a shaft-supporting member is provided at the end portion of the cam groove so as to be elastically supported.

3. The disk apparatus according to claim 1,
wherein a flexible shaft-supporting member is provided at the end portion of the cam groove.

4. A disk apparatus comprising a lift mechanism for raising and lowering a clamp head so as to be, respectively, attached to and detached from an optical disk,
wherein a driven pin, having an elastic ring and a first portion, guided along a cam groove, having a double cam groove structure, formed in the lift mechanism is regulated and supported by the cam groove in the course of reaching an end portion of the cam groove, and the driven pin is elastically supported by the elastic ring, which is in close contact with a portion of the double cam groove structure, at the end portion and when the driven pin reaches the end portion of the cam groove of the lift mechanism, the first portion of the driven pin is separated from the guiding cam groove.

5. A disk apparatus comprising:
a frame member, having
a clamp head for clamping and rotationally driving an optical disk, and
a head unit for applying a laser beam to the optical disk clamped with the clamp head; and
a lift mechanism for raising and lowering the frame member having the clamp head, to clamp and release the optical disk, respectively, the lift mechanism including
a driven pin, having a first portion and an elastic member, that is fixed to the frame member, and
a slidable member having a cam groove or guiding and supporting the driven pin;
wherein the cam groove is formed to include a first area for supporting the driven pin by its elastic member and a second area for supporting the driven pin by its first portion, and
the cam groove is structured and arranged in the slidable member, such that the frame member is raised by guiding the driven pin along the cam groove with movement of the slidable member, and
in the state in which the clamp head clamps the optical disk, the elastic member is supported by the first area of the cam groove, the first portion of the driven pin is separated from the second area of the cam groove, and the driven pin and the frame member are elastically supported by the slidable member.

6. The disk apparatus according to claim 5, wherein the elastic member has a ring shape and the first portion of the driven pin is located at the center of the ring and, in the state in which the clamp head clamps the optical disk, said ring-shaped elastic member is in contact with the first area of the cam groove.

7. The disk apparatus according to claim 5, wherein, in the process in which the lift mechanism raises and lowers the frame member, the first portion of the driven pin is supported by the second area of the cam groove; the elastic member is separated from the first area of the cam groove; and the driven pin and the frame member are elastically supported by the first portion of the driven pin.

8. A disk apparatus comprising:
a frame member including
a clamp head for clamping and rotationally driving an optical disk, and
a head unit for applying a laser beam to the optical disk clamped with the clamp head;
a lift mechanism for raising and lowering the frame member including the clamp head, to clamp and release the optical disk, respectively, the lift mechanism including:
a driven pin fixed to the frame member, and
a cam groove for guiding the driven pin;
wherein the cam groove is formed to include a first cam groove formed in a slidable member and a second cam groove formed in a shaft supporting member fixed to and supported by the slidable member through an elastic member, and
the first cam groove is coupled to the second cam groove, and, in the state in which the clamp head clamps the optical disk, the driven pin is supported by the second cam groove, and the driven pin and the frame member are elastically supported by the slidable member.

9. The disk apparatus according to claim 8, wherein in the process in which the lift mechanism raises and lowers the frame member, the driven pin is supported by the first cain groove.

10. A disk apparatus comprising:
a frame member including
a clamp head for clamping and rotationally driving an optical disk, and
a head unit for applying a laser beam to the optical disk clamped with the clamp head;
a lift mechanism for raising and lowering the frame member including the clamp bead, to clamp and release the optical disk, the lift mechanism including
a driven pin fixed to the frame member, and
a cam groove for guiding the driven pin that is structured and arranged such that the frame member is raised or lowered by guiding the driven pin along the cam groove;
wherein the cam groove includes a first cam groove formed in a slidable member and a second cam groove formed in a flexible shaft supporting member fixed to and supported by the slidable member, and
the first cam groove is coupled to the second cam groove, and, in the state in which the clamp head clamps the optical disk, the driven pin is supported by the second cam groove, and the driven pin and the frame member are elastically supported by the slidable member.

11. The disk apparatus according to claim 10, wherein, in the process in which the lift mechanism raises and lowers the frame member, the driven pin is supported by the first can groove.

* * * * *